US012691882B2

(12) United States Patent
Teramachi

(10) Patent No.: US 12,691,882 B2
(45) Date of Patent: Jul. 28, 2026

(54) CONTROL DEVICE, CONTROL METHOD, AND STORAGE MEDIUM

(71) Applicant: HONDA MOTOR CO., LTD., Tokyo (JP)

(72) Inventor: Tomotaka Teramachi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/059,748

(22) Filed: Feb. 21, 2025

(65) Prior Publication Data

US 2025/0282360 A1 Sep. 11, 2025

(30) Foreign Application Priority Data

Mar. 7, 2024 (JP) ................................. 2024-035375

(51) Int. Cl.
*B60W 30/18* (2012.01)
*B60W 50/14* (2020.01)

(52) U.S. Cl.
CPC ...... *B60W 30/18163* (2013.01); *B60W 50/14* (2013.01); *B60W 2520/10* (2013.01); *B60W 2552/10* (2020.02); *B60W 2552/30* (2020.02); *B60W 2720/106* (2013.01)

(58) Field of Classification Search
None
See application file for complete search history.

(56) References Cited

U.S. PATENT DOCUMENTS

2018/0037223 A1 2/2018 Goto et al.
2020/0307595 A1 10/2020 Kato et al.

2020/0307600 A1* 10/2020 Sato ......................... G08G 1/167
2020/0398849 A1* 12/2020 Kanoh ...................... G08G 1/16
2023/0286509 A1* 9/2023 Kume ............... B60W 60/0051
(Continued)

FOREIGN PATENT DOCUMENTS

JP 2016-193666 11/2016
JP 2017-142750 8/2017
JP 2020-163907 10/2020
(Continued)

OTHER PUBLICATIONS

Japanese Office Action for Japanese Patent Application No. 2024-035375 mailed Oct. 7, 2025.

*Primary Examiner* — Peter D Nolan
*Assistant Examiner* — Jacob Kent Besteman-Street
(74) *Attorney, Agent, or Firm* — Amin, Turocy & Watson, LLP

(57) ABSTRACT

A control device performs: determining (a) whether a length in a traveling direction of a connection area in which a first lane and a second lane are connected satisfies being a length for changing a lane of a mobile object; determining (b) whether changing the lane of the mobile object to the second lane is possible in the connection area at a mobile object speed; notifying an occupant that the mobile object is not able to change the lane before the mobile object arrives at the second lane and when (a) is not satisfied; and decelerating the mobile object to a speed at which the mobile object is able to change the lane and which is equal to or higher than the prescribed speed when the mobile object is scheduled to change the lane to the second lane and when (a) is satisfied and (b) is not satisfied.

11 Claims, 7 Drawing Sheets

(56) References Cited

U.S. PATENT DOCUMENTS

| | | | |
|---|---|---|---|
| 2024/0101143 A1* | 3/2024 | Kawano | ............... G06V 20/582 |
| 2024/0227813 A1* | 7/2024 | Goto | ............... B60W 30/18163 |

FOREIGN PATENT DOCUMENTS

| | | |
|---|---|---|
| JP | 2021-091282 | 6/2021 |
| JP | 2022-182463 | 12/2022 |
| JP | 2023-146020 | 10/2023 |
| WO | 2019/163121 | 8/2019 |

* cited by examiner

<u>1</u>

COMPARATIVE EXAMPLE

FIG. 3

CASE A

OPERATION FOR STARTING ALC

IMPOSSIBILITY IS NOTIFIED OF

CASE B

| DETERMINATION RESULT | PROCESS | CASE |
|---|---|---|
| LENGTH OF CONNECTION AREA IS LESS THAN LENGTH BASED ON SPEED AT WHICH ALC IS POSSIBLE (ALLOWABLE SPEED BASED ON LENGTH OF TARGET AREA IS EQUAL TO OR LOWER THAN PRESCRIBED SPEED AT WHICH ALC IS POSSIBLE) | IMPOSSIBILITY IS NOTIFIED OF IN PREDETERMINED DISTANCE BEFORE START POINT | A |
| LENGTH OF CONNECTION AREA IS EQUAL TO OR GREATER THAN LENGTH BASED ON SPEED AT WHICH ALC IS POSSIBLE AND VEHICLE SPEED IS HIGHER THAN ALLOWABLE SPEED OF CONNECTION AREA | VEHICLE SPEED IS LOWERED TO BE EQUAL TO OR LESS THAN ALLOWABLE SPEED | B |
| CURVATURE OF TARGET AREA IS EQUAL TO OR GREATER THAN THRESHOLD VALUE | IMPOSSIBILITY IS NOTIFIED OF IN PREDETERMINED DISTANCE BEFORE START POINT | C |

| LENGTH RANGE | ALLOWABLE SPEED |
|---|---|
| La-Lb | X1km/h |
| Lc-Ld | X2km/h |
| ⋮ | ⋮ |

CONTROL DEVICE, CONTROL METHOD, AND STORAGE MEDIUM

CROSS-REFERENCE TO RELATED APPLICATION

Priority is claimed on Japanese Patent Application No. 2024-035375, filed Mar. 7, 2024, the content of which is incorporated herein by reference.

BACKGROUND

Field of the Invention

The present invention relates to a control device, a control method, and a storage medium.

Description of Related Art

Recently, measures for providing a sustainable transportation system in consideration of various situations have been actively realized. Focus has been put on research and development for further improving safety or convenience of traffic through research and development for driving support technology toward such realization. For example, a vehicle control device that sets a quit position of steering support with respect to a termination at which a traveling lane and a branch lane are adjacent according to a traveling speed has been disclosed (for example, Patent Document 1: Japanese Unexamined Patent Application, First Publication No. 2023-146020).

SUMMARY

In the related art, control which is appropriate for roads may not be performed, and convenience to an occupant may not be satisfactory.

The present invention was made in consideration of the aforementioned circumstances, and an objective thereof is to provide a control device, a control method, and a storage medium that can improve convenience to an occupant (for example, a driver) of a mobile object. Another objective thereof is to further contribute to development of a sustainable transportation system.

A control device, a control method, and a storage medium according to the present invention employ the following configurations.

(1) According to an aspect of the present invention, a control device is provided, including: a storage medium storing computer-readable instructions; and one or more processors connected to the storage medium, wherein the one or more processors execute the computer-readable instructions to perform: determining whether automatic lane change control for automatically changing a lane of a mobile object to a second lane which is adjacent to a first lane in which the mobile object travels is executable; changing the lane of the mobile object when the automatic lane change control is executable; the second lane being a lane which is not present at a position at which the mobile object is traveling and which is added in front of the position in a traveling direction of the mobile object, determining (a) whether a length in the traveling direction of a connection area in which the first lane and the second lane are connected satisfies being a length for changing a lane of the mobile object to the second lane at a speed equal to or higher than a prescribed speed at which the automatic lane change control is executable; determining (b) whether changing a lane of the mobile object to the second lane is possible in the connection area at a current speed of the mobile object or a mobile object speed when the mobile object is assumed to arrive at the second lane; notifying an occupant of the mobile object that the mobile object is not able to change the lane to the second lane through the automatic lane change control before the mobile object arrives at the second lane when the mobile object is scheduled to change the lane to the second lane and when (a) is not satisfied; and decelerating the mobile object to a speed at which the mobile object is able to change the lane to the second lane and which is equal to or higher than the prescribed speed when the mobile object is scheduled to change the lane to the second lane and when (a) is satisfied and (b) is not satisfied.

(2) In the aspect of (1), the one or more processors execute the computer-readable instructions to perform determining that (b) is not satisfied when the length in the traveling direction of the connection area is less than a length in which the mobile object is able to change the lane to the second lane at the mobile object speed.

(3) In the aspect of (2), a release position of the automatic lane change control is set on a near side in the traveling direction with respect to an end point of the connection area, and the one or more processors execute the computer-readable instructions to perform delivery of the notification before the mobile object arrives at the release position because the automatic lane change control is not executable when the mobile object travels at a speed equal to or higher than the prescribed speed and the release position is located on a near side in the traveling direction with respect to a start point of the connection area.

(4) In the aspect of (1), the one or more processors execute the computer-readable instructions to perform determining that (b) is satisfied when the mobile object speed is equal to or lower than an allowable speed, and the allowable speed is a speed which is set according to the length of the traveling direction of the connection area and at which the mobile object is able to change the lane to the second lane from the first lane.

(5) In the aspect of (1), the one or more processors execute the computer-readable instructions to perform: determining whether a road curvature in the second lane or in the vicinity of the second lane is a curvature in which the automatic lane change control to the second lane is not executable when the mobile object travels at a speed equal to or higher than the prescribed speed; and notifying the occupant of the mobile object that the mobile object is not able to change the lane to the second lane through the automatic lane change control before the mobile object arrives at the second lane before the mobile object arrives at the second lane when it is determined that the road curvature is a curvature in which the automatic lane change control to the second lane is not executable.

(6) In the aspect of (5), the one or more processors execute the computer-readable instructions to perform: determining whether a road curvature at a start point of the connection area or in the vicinity of the start point of the connection area is a curvature in which the automatic lane change control to the second lane is not executable when the mobile object travels at a speed equal to or higher than the prescribed speed; and notifying the occupant of the mobile object that the mobile object is not able to change the lane to the second lane through the automatic lane change control before the mobile object arrives at the second lane before the mobile object arrives at the second lane when it is determined that the road curvature is a curvature in which the automatic lane change control to the second lane is not executable.

(7) In the aspect of (6), the one or more processors execute the computer-readable instructions to perform determining that the automatic lane change control to the second lane is executable when it is determined that the road curvature at the start point or in the vicinity of the start point of the connection area is a curvature in which the automatic lane change control to the second lane is not executable when the mobile object travels at a speed equal to or higher than the prescribed speed and it is determined that the length in the traveling direction is equal to or greater than a predetermined length.

(8) In the aspect of (7), the predetermined length is a length in which the automatic lane change control is executable when the road curvature at the start point or in the vicinity of the start point of the connection area is equal to or less than a threshold value and the mobile object is decelerated in a range which is not less than the prescribed speed.

(9) In the aspect of (1), the one or more processors execute the computer-readable instructions to perform: determining that (a) is satisfied when an allowable speed correlated with the length in the traveling direction of the connection area is equal to or greater than a prescribed speed at which the automatic lane change control is executable; and determining that (b) is satisfied when the mobile object speed is equal to or lower than an allowable speed, and the allowable speed is a speed which is set according to the length in the traveling direction of the connection area and at which the mobile object is able to change the lane.

(10) According to another aspect of the present invention, a control method is provided that is performed by a computer, the control method including: a process of determining whether automatic lane change control for automatically changing a lane of a mobile object to a second lane which is adjacent to a first lane in which the mobile object travels is executable; a process of changing the lane of the mobile object when the automatic lane change control is executable; the second lane being a lane which is not present at a position at which the mobile object is traveling and which is added in front of the position in a traveling direction of the mobile object, a process of determining (a) whether a length in the traveling direction of a connection area in which the first lane and the second lane are connected satisfies being a length for changing a lane of the mobile object to the second lane at a speed equal to or higher than a prescribed speed at which the automatic lane change control is executable; a process of determining (b) whether changing a lane of the mobile object to the second lane is possible in the connection area at a current speed of the mobile object or a mobile object speed when the mobile object is assumed to arrive at the second lane; a process of notifying an occupant of the mobile object that the mobile object is not able to change the lane to the second lane through the automatic lane change control before the mobile object arrives at the second lane when the mobile object is scheduled to change the lane to the second lane and when (a) is not satisfied; and a process of decelerating the mobile object to a speed at which the mobile object is able to change the lane to the second lane and which is equal to or higher than the prescribed speed when the mobile object is scheduled to change the lane to the second lane and when (a) is satisfied and (b) is not satisfied.

(11) According to another aspect of the present invention, a storage medium storing a program is provided, the program causing a computer to perform: a process of determining whether automatic lane change control for automatically changing a lane of a mobile object to a second lane which is adjacent to a first lane in which the mobile object travels is executable; a process of changing the lane of the mobile object when the automatic lane change control is executable; the second lane being a lane which is not present at a position at which the mobile object is traveling and which is added in front of the position in a traveling direction of the mobile object, a process of determining (a) whether a length in the traveling direction of a connection area in which the first lane and the second lane are connected satisfies being a length for changing a lane of the mobile object to the second lane at a speed equal to or higher than a prescribed speed at which the automatic lane change control is executable; a process of determining (b) whether changing a lane of the mobile object to the second lane is possible in the connection area at a current speed of the mobile object or a mobile object speed when the mobile object is assumed to arrive at the second lane; a process of notifying an occupant of the mobile object that the mobile object is not able to change the lane to the second lane through the automatic lane change control before the mobile object arrives at the second lane when the mobile object is scheduled to change the lane to the second lane and when (a) is not satisfied; and a process of decelerating the mobile object to a speed at which the mobile object is able to change the lane to the second lane and which is equal to or higher than the prescribed speed when the mobile object is scheduled to change the lane to the second lane and when (a) is satisfied and (b) is not satisfied.

According to the aspects of (1) to (11), it is possible to improve convenience to an occupant (for example, a driver) of a mobile object. For example, the control device can realize control based on a shape of a branch lane or the vicinity of the branch lane. Specifically, the control device enables execution of automatic lane change control by decelerating the mobile object or notifies that automatic lane change control is not executable in advance when the automatic lane change control is not executable even through deceleration, and thus it is possible to improve convenience to the occupant of the mobile object.

According to the aspect of (2), the control device can more accurately determine whether automatic lane change control is executable on the basis of the length of the connection area.

According to the aspect of (3), it is possible to assist the occupant with manual lane change with ample time by notifying that automatic lane change control is not executable before the mobile object arrives at a quit position.

According to the aspect of (5), the control device can more accurately determine that automatic lane change control is not executable and notify the occupant in advance.

According to the aspect of (6), since the road curvature is equal to or greater than the threshold value, it is possible to notify the occupant that it is difficult to recognize a forward view of the mobile object and automatic lane change control is not executable in advance.

According to the aspect of (7), when a curvature at or in the vicinity of a start position of automatic lane change control is equal to or greater than the threshold value and the length of the connection area is a predetermined distance, the control device performs automatic lane change control. Accordingly, it is possible to reduce a burden on the occupant.

According to the aspect of (8), by setting the length of the predetermined distance in the aspect of (7) to be larger when the curvature at or in the vicinity of the start position of lane change is greater than a reference than when the curvature is less than the reference, the control device can perform automatic lane change control with ample time even if the curvature is greater than the reference.

BRIEF DESCRIPTION OF THE DRAWINGS

FIG. 3 is a diagram showing control in Case A.

FIG. 4 is a diagram showing control in Case B.

FIG. 5 is a diagram showing control in Case C.

FIG. 6 is a diagram showing control in Cases A to C.

FIG. 7 is a diagram showing an example of correspondence information.

DETAILED DESCRIPTION OF THE INVENTION

Entire Configuration

Figure 1:
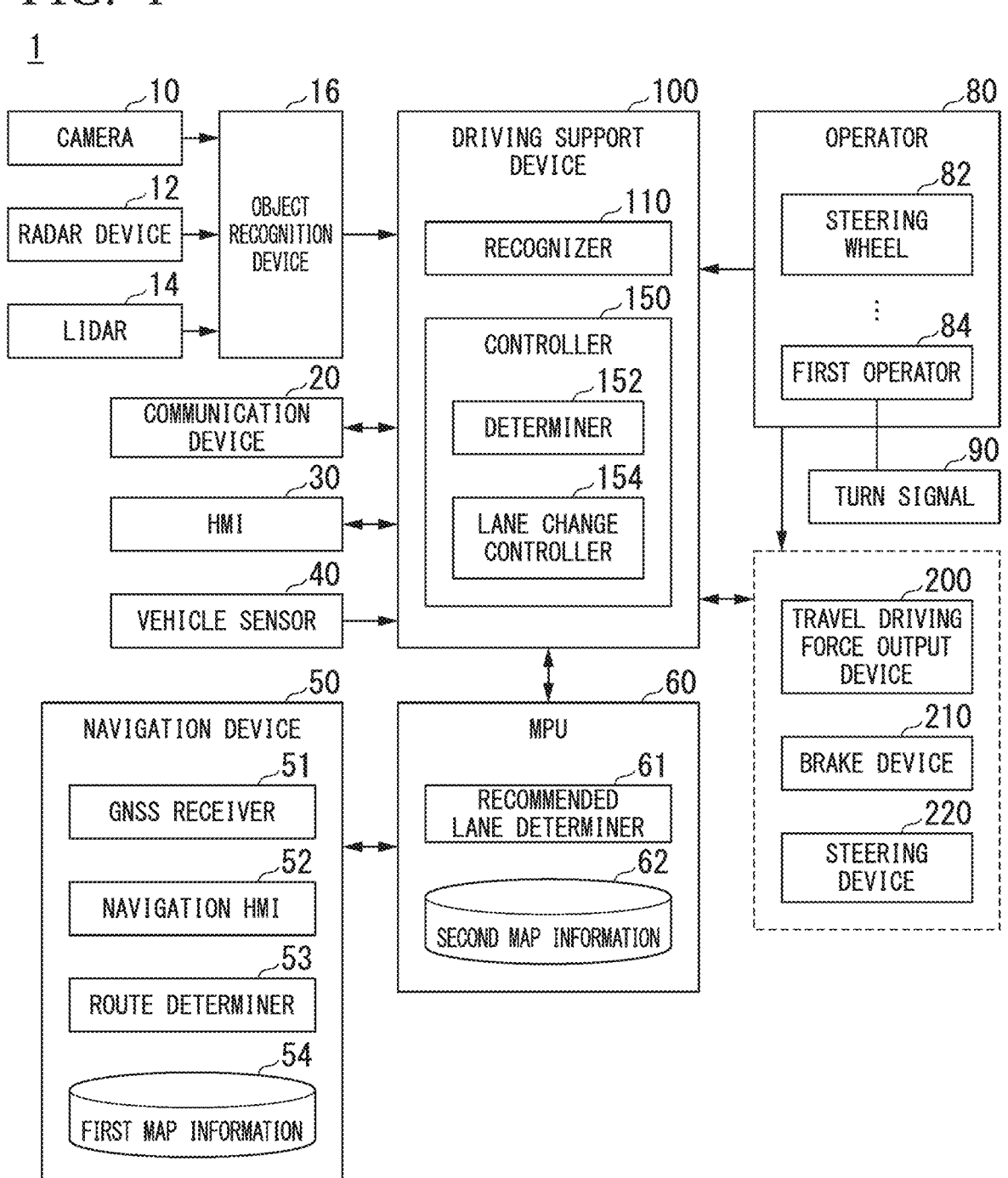
FIG. 1 is a diagram showing a configuration of a vehicle system employing a vehicle control system according to an embodiment.

FIG. 1 is a diagram showing a configuration of a vehicle system 1 employing a vehicle control system according to an embodiment. A vehicle in which the vehicle system 1 is mounted is, for example, a vehicle with two wheels, three wheels, or four wheels, and a drive source thereof is an internal combustion engine such as a diesel engine or a gasoline engine, an electric motor, or a combination thereof. The electric motor operates using electric power generated by a power generator connected to the internal combustion engine or using electric power discharged from a secondary battery or a fuel cell. It is assumed that the present embodiment is applied to a vehicle, but the present embodiment may be applied to a mobile object other than a vehicle.

The vehicle system 1 includes, for example, a camera 10, a radar device 12, a Light Detection and Ranging (LIDAR) device 14, an object recognition device 16, a communication device 20, a human-machine interface (HMI) 30, a vehicle sensor 40, a navigation device 50, an MPU 60, an operator 80, a turn signal 90, a driving support device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration shown in FIG. 1 is only an example, and part of the configuration may be omitted or another configuration may be added thereto. The driving support device 100 is an example of a "vehicle control device."

The camera 10 is, for example, a digital camera using a solid-state imaging device such as a charge-coupled device (CCD) or a complementary metal-oxide-semiconductor (CMOS). The camera 10 is attached to an arbitrary position on a vehicle in which the vehicle system 1 is mounted (hereinafter referred to as a vehicle M). When a forward view is imaged, the camera 10 is attached to an upper part of a front windshield, a rear surface of a rearview mirror, or the like. The camera 10 images the surroundings of the vehicle M, for example, periodically and repeatedly. The camera 10 may be a stereo camera.

The radar device 12 radiates radio waves such as millimeter waves to the surroundings of the vehicle M, detects radio waves (reflected waves) reflected by an object, and detects at least a position (a distance and a direction) of the object. The radar device 12 is attached to an arbitrary position on the vehicle M. The radar device 12 may detect a position and a speed of an object using a frequency-modulated continuous wave (FM-CW) method.

The LIDAR device 14 radiates light (or electromagnetic waves of wavelengths close to light) to the surroundings of the vehicle M and measures scattered light. The LIDAR device 14 detects a distance to an object on the basis of a time from radiation of light to reception of light. The radiated light is, for example, a pulse-like laser beam. The LIDAR device 14 is attached to an arbitrary position on the vehicle M.

The object recognition device 16 performs a sensor fusion process on results of detection from some or all of the camera 10, the radar device 12, and the LIDAR device 14 and recognizes a position, a type, a speed, and the like of an object. The object recognition device 16 outputs the result of recognition to the driving support device 100. The object recognition device 16 may output the results of detection from the camera 10, the radar device 12, and the LIDAR device 14 to the driving support device 100 without any change. The object recognition device 16 may be omitted from the vehicle system 1.

The communication device 20 communicates with other vehicles near the vehicle M, for example, using a cellular network, a Wi-Fi network, Bluetooth (registered trademark), or dedicated short-range communication (DSRC) or communicates with various server devices via radio base stations.

The HMI 30 presents various types of information to an occupant of the vehicle M and receives an input operation from the occupant. The HMI 30 includes various display devices, a speaker, buzzers, a touch panel, switches, and keys. The HMI 30 includes a display device. The display device is, for example, a display device, that is, a multi-information display, that is provided at the center of an instrument panel of the vehicle M and displays various types of information on the vehicle M such as a speed meter (a speedometer) showing a traveling speed of the vehicle M or a revolution counter (a tachometer) showing the number of revolutions (a rotation speed) of the internal combustion engine provided in the vehicle M.

The vehicle sensor 40 includes a vehicle speed sensor that detects a speed of the vehicle M, an acceleration sensor that detects acceleration, a yaw rate sensor that detects an angular velocity around a vertical axis, and a direction sensor that detects a direction of the vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the vehicle M on the basis of signals received from GNSS satellites. The position of the vehicle M may be identified or corrected by an inertial navigation system (INS) using the output of the vehicle sensor 40. The navigation HMI 52 includes a display device, a speaker, a touch panel, and keys. The navigation HMI 52 may be partially or wholly shared by the HMI 30. For example, the route determiner 53 determines a route (hereinafter referred to as a route on a map) from the position of the vehicle M identified by the GNSS receiver 51 (or an input arbitrary position) to a destination input by an occupant using the navigation HMI 52 with reference to the first map information 54. The first map information 54 is, for example, information in which a road shape is expressed by links indicating a road and nodes connected by the links. The first map information 54 may include a curvature of a road and point of interest (POI) information. The route on a map is output to the MPU 60. The navigation device 50 may perform route guidance using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determiner 61 and stores second map information 62 in a storage device such as an HDD or a flash memory. The recommended lane determiner 61 divides a route on a map provided from the navigation device 50 into a plurality of blocks (for example, every 100 [m] in a vehicle traveling direction) and determines a recommended lane for each block with reference to the second map information 62. The recommended lane determiner 61 determines in which lane from the leftmost the vehicle is to travel. When there is a branching point in the route on a map, the recommended lane determiner 61 determines the recommended lane such that the vehicle M can travel along a rational route for traveling to a branching destination. For example, when the vehicle M arrives at a position in a predetermined distance before a branch lane, the recommended lane determiner 61 determines a lane connected to the branch lane as a recommended lane. The recommended lane determiner 61 and the second map information 62 may be a functional unit and information included in another device such as a driving support device 100.

The second map information 62 is map information with higher precision than the first map information 54. For example, the second map information 62 may include information of centers of lanes and information of boundaries of lanes. The second map information 62 may include road information, traffic regulation information, address information (addresses and postal codes), facility information, and phone number information. The second map information 62 may be updated from time to time by causing the communication device 20 to communicate with another device.

The operator 80 includes, for example, an accelerator pedal, a brake pedal, a shift lever, and other operators in addition to a steering wheel 82. A sensor that detects an amount of operation or performing of an operation is attached to the operator 80. A result of detection of the sensor is output to the driving support device 100 or output to some or all of the travel driving force output device 200, the brake device 210, and the steering device 220. The steering wheel 82 does not have to have a ring shape and may have a shape of a deformed steering wheel, a joystick, a button, or the like. The operator 80 includes a first operator 84. The turn signal 90 is turned on or turned off according to an operation of the first operator 84.

The first operator 84 is, for example, a turn signal lever switch. For example, when a driver operates the first operator 84, the turn signal 90 is turned on in response to the operation. When the driver performs a predetermined operation on the first operator 84, a controller 150 starts an auto lane change (ALC) function and causes the vehicle M to perform automatic lane change (auto lane change). The predetermined operation is an operation serving as a trigger for starting the ALC function. The predetermined operation is, for example, an operation of operating the turn signal lever switch in a direction in which a lane is to be changed or an operation of pressing the turn signal lever switch to a predetermined position. More specifically, the predetermined operation is an operation of operating the turn signal lever switch in a state in which a predetermined position is maintained in a direction in which a lane is to be changed for a predetermined time. The first operator 84 may be another type such as a button instead of the turn signal lever switch. The ALC function may be started in response to an operation on another operator such as a predetermined button.

The driving support device 100 includes, for example, a recognizer 110 and the controller 150. The recognizer 110 and the controller 150 are realized, for example, by causing a hardware processor such as a central processing unit (CPU) to execute a program (software). Some or all of these constituents may be realized by hardware (a circuit part including circuitry) such as a large-scale integration (LSI) device, an application-specific integrated circuit (ASIC), or a field-programmable gate array (FPGA), a graphics-processing unit (GPU), or a system on chip (SOC) or may be cooperatively realized by software and hardware. The program may be stored in a storage device (a storage device including a non-transitory storage medium) such as an HDD or a flash memory of the driving support device 100 in advance, or may be stored in a removable storage medium such as a DVD or a CD-ROM and installed in the HDD or the flash memory of the driving support device 100 by setting the removable storage medium (a non-transitory storage medium) into a drive device.

The recognizer 110 recognizes states such as a position, a speed, and an acceleration of an object near the vehicle M on the basis of information input from the camera 10, the radar device 12, and the LIDAR device 14 via the object recognition device 16. For example, a position of an object is recognized as a position in an absolute coordinate system with an origin set to a representative point (such as the center of gravity or the center of a drive shaft) of the vehicle M and is used for control. A position of an object may be expressed as a representative point such as the center of gravity or a corner of the object or may be expressed as an area. A "state" of an object may include an acceleration or a jerk of the object or a "moving state" (for example, whether lane change is being performed or whether lane change is going to be performed) of the object.

The recognizer 110 recognizes, for example, a lane (a traveling lane) in which the vehicle M is traveling. For example, the recognizer 110 recognizes the traveling lane through comparison between a pattern of road markings (for example, arrangement of a solid line and a dotted line) obtained from the second map information 62 and a pattern of road markings near the vehicle M recognized from an image captured by the camera 10. The recognizer 110 is not limited to the road markings, but may recognize the traveling lane by recognizing a road marking or traveling lane boundaries (road boundaries) including roadsides, curbstones, median strips, guard rails, and the like. In this recognition, the position of the vehicle M acquired from the navigation device 50 or the result of processing from the INS may be considered. The recognizer 110 recognizes a stop line, an obstacle, a red signal, a toll gate, or other road events.

The recognizer 110 recognizes a position or a direction of the vehicle M with respect to a traveling lane at the time of recognition of the traveling lane. The recognizer 110 may recognize, for example, a separation of a reference point of the vehicle M from the lane center and an angle of the traveling direction of the vehicle M with respect to a line formed by connecting the lane centers as the position and the direction of the vehicle M with respect to the traveling lane. Instead, the recognizer 110 may recognize a position of a reference point of the vehicle M with respect to one side line of the traveling lane (a road marking or a road boundary) or the like as the relative position of the vehicle M with respect to the traveling lane.

The controller 150 performs driving support control. For example, the controller 150 automatically controls the travel driving force output device 200 and the brake device 210 regardless of the driver's operation such that the speed of the vehicle M is automatically controlled. The controller 150 performs so-called adaptive cruise control (ACC). The controller 150 performs control such that the vehicle M travels at a set speed or travels to follow a preceding vehicle at a position in a predetermined distance from the preceding vehicle.

The controller 150 controls the steering device 220 such that the vehicle M does not depart from (leave) a traveling lane. For example, the controller 150 controls the steering device 220 such that the vehicle M travels at the center of the traveling lane recognized by the recognizer 110 or in the vicinity of the center. In the following description, this control may be referred to as "lane keeping control." The controller 150 performs hands-on lane keeping control and hands-off lane keeping control.

Hands-on lane keeping control is control that is performed in a state in which a driver grasps the steering wheel (a state in which grasping of the steering wheel is detected by a steering grasp sensor which is not shown). Conditions in which hands-on lane keeping control is executable are less strict than conditions in which hands-off lane keeping control is executable.

Hands-off lane keeping control is control that is performed in a state in which a driver does not grasp the steering wheel (a state in which grasping of the steering wheel is not detected by a steering grasp sensor which is not shown). Hands-off lane keeping control is executable, for example, when the following conditions are satisfied. The conditions include a condition in which a speed of the vehicle M is equal to or higher than a predetermined speed, a condition in which the vehicle M is traveling on a predetermined road (for example, a road or road type which is set to allow hands-off lane keeping control in advance), and a condition in which a driver monitors the forward view. Hands-off lane keeping control is performed when a driver monitors a forward view, and hands-off lane keeping control is not performed or is stopped when a driver does not monitor a forward view.

The aforementioned conditions in which hands-on lane keeping control and hands-off lane keeping control are executable are only examples, and another condition (for example, a condition in which the vehicle M follows a preceding vehicle) may be added or some conditions may be omitted. Conditions in which hands-on lane keeping control is executable have only to be less strict than conditions in which hands-off lane keeping control is executable (conditions in which hands-off lane keeping control is executable have only to be stricter than conditions in which hands-on lane keeping control is executable). Whether a driver monitors a forward view is recognized by the driving support device 100 on the basis of an image captured by a camera (not shown) for imaging a driver.

The controller 150 includes a determiner 152 and a lane change controller 154. The controller 150 automatically changes a lane of the vehicle M. Details thereof will be described later. Automatic lane change control for automatically changing a lane may be performed when hands-off lane keeping control is being performed or when hands-on lane keeping control is being performed.

The travel driving force output device 200 outputs a travel driving force (a torque) for allowing the vehicle M to travel to driving wheels. The travel driving force output device 200 includes, for example, a combination of an internal combustion engine, an electric motor, and a transmission, and an electronic control unit (ECU) that controls them. The ECU controls the aforementioned constituents on the basis of information input from the driving support device 100 or information input from the operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the driving support device 100 or the information input from the operator 80 such that a brake torque based on a braking operation is output to vehicle wheels.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the driving support device 100 or the information input from the operator 80 and changes the direction of the turning wheels.

Comparative Examples

Figure 2:
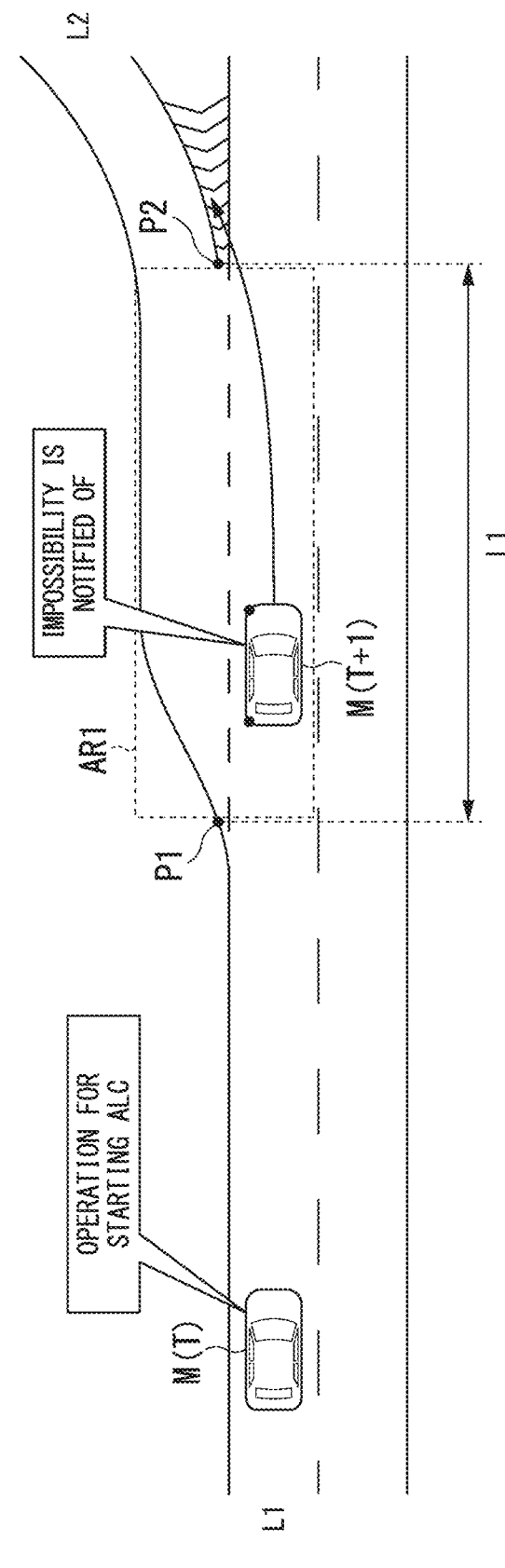
FIG. 2 is a diagram showing a comparative example.

FIG. 2 is a diagram showing a comparative example. In this comparative example, when the vehicle M is scheduled to change a lane to a second lane L2 which is a branch lane and the second lane L2 does not satisfy a condition for performing automatic lane change control, it may be notified that automatic lane change control is not executable after the vehicle M has arrived at the second lane L2. In FIG. 2, there is the second lane L2 which is a branch lane branching from a first lane. The vehicle M can change the traveling lane from the first lane L1 to the second lane L2 in a connection area AR1 in which the first lane L1 and the second lane L2 are connected (an area in which the first lane L1 and the second lane L2 are adjacent). A start point of the connection area AR1 is a position P1. The position P1 is a start point of the second lane L2. An end point of the connection area AR1 is a position P2. The position P2 is a position at which the first lane L1 and the second lane L2 are separated.

At time T, when an occupant of the vehicle M performs an operation of instructing automatic lane change control from the second lane L2 in a predetermined distance before the position P1, a driving support device according to the comparative example determines whether a length L1 from the position P1 to the position P2 satisfies a condition. The condition is that the length L1 is a length in which lane change is possible at a speed of the vehicle M with ample time. For example, when the length L1 is a length not satisfying the condition, the vehicle M may not move laterally to the second lane L2 and enter a zebra zone (a flowing zone) or the like located in front of the position P2 to perform lane change as indicated by an arrow in FIG. 2. For the purpose of prevention thereof, in the comparative example, when the condition is not satisfied, impossibility is notified of, but this notification may be performed after the vehicle M has passed through the position P1. In this case, a driver of the vehicle M needs to manually change the lane to the second lane L2. At the time of provision of control to the driver, the vehicle M arrives at the middle of the connection area AR1 in the traveling direction of the vehicle M, and thus the driver needs to rapidly change the lane of the vehicle M. In this way, in the comparative example, a situation which is not appropriate for the driver may be provided.

In the present embodiment, it is possible to improve convenience to a user by performing determination and control as described below.

Control for Lane Change

The determiner 152 determines whether automatic lane change control (ALC) for automatically changing a lane of the vehicle M to a second lane which is adjacent to a first lane in which the vehicle M is traveling is executable. The lane change controller 154 changes the lane of the vehicle M when automatic lane change control is executable. Automatic lane change control is performed when the speed of the vehicle M is equal to or higher than a prescribed speed. For example, when the speed of the vehicle M is lower than the prescribed speed, automatic lane change control is not performed, and a driver needs to manually change the lane of the vehicle M. The second lane is a lane which is not present at a position at which the vehicle M is traveling and which is added in front of the position in a traveling direction of the vehicle M. The added lane is, for example, a branch lane.

The determiner 152 determines (a) whether a length of a connection area AR1 in which the first lane and the second lane are connected in the traveling direction of the vehicle M satisfies being a length for changing the lane of the vehicle M to the second lane at a speed equal to or higher than the prescribed speed at which the automatic lane change control is executable. The length for changing the lane of the vehicle M to the second lane at a speed equal to or higher than the prescribed speed is a preset length. The determiner 152 may determine that (a) is satisfied when an allowable speed correlated with the length in the traveling direction of the connection area is equal to or higher than the prescribed speed at which automatic lane change control is executable.

The determiner 152 determines (b) whether changing the lane to the second lane is possible in the connection area at a current speed of the vehicle M or a vehicle speed which is a speed when the vehicle M is assumed to arrive at the second lane. The determiner 152 determines that (b) is not satisfied when the length of the connection area in the traveling direction of the vehicle M is less than the length in which lane change to the second lane at the vehicle speed is possible. More specifically, the determiner 152 determines that (b) is not satisfied when the vehicle speed is higher than an allowable speed, and determines that (b) is satisfied when the vehicle speed is equal to or less than the allowable speed. The allowable speed is a speed at which the vehicle M can change the lane from the first lane to the second lane and which is set according to the length of the connection area in the traveling direction of the vehicle M.

The lane change controller 154 notifies an occupant of the vehicle M that the vehicle M is not able to change the lane to the second lane through the automatic lane change control before the vehicle M arrives at the second lane when the vehicle M is scheduled to change the lane to the second lane and when (a) is not satisfied. The lane change controller 154 decelerates the vehicle M to a speed at which the vehicle M is able to change the lane to the second lane and which is equal to or higher than the prescribed speed when the vehicle M is scheduled to change the lane to the second lane and when (a) is satisfied and (b) is not satisfied.

The length of the connection area in the traveling direction of the vehicle M is acquired from map information or acquired from the recognition result of the recognizer 110. The determiner 152 acquires the length of the connection area in the traveling direction of the vehicle M with reference to the first map information 54 or the second map information 62 or acquires the length of the connection area in the traveling direction of the vehicle M from the recognition result of the recognizer 110.

The process according to the present embodiment is performed, for example, when the vehicle M is scheduled to change the lane from the first lane L1 to the branch lane (the second lane L2). The automatic lane change control to the branch lane may be started when an occupant operates the first operator 84 to instruct lane change to the branch lane or may be started when lane change to the branch lane is reserved in advance. The reservation is, for example, a predetermined operation by an occupant of the vehicle M or a plan for causing the vehicle M to travel along a branch lane in a route to a set destination. The present embodiment is applied when lane change is scheduled to be performed as described above, but the driving support device 100 may notify the driver that lane change to the branch lane is not possible through automatic lane change control when the aforementioned operation or reservation is not performed when such an operation or reservation is not performed and lane change to the branch lane is not possible even through the automatic lane change control in addition thereto (or instead thereof).

Case A

Figure 3:
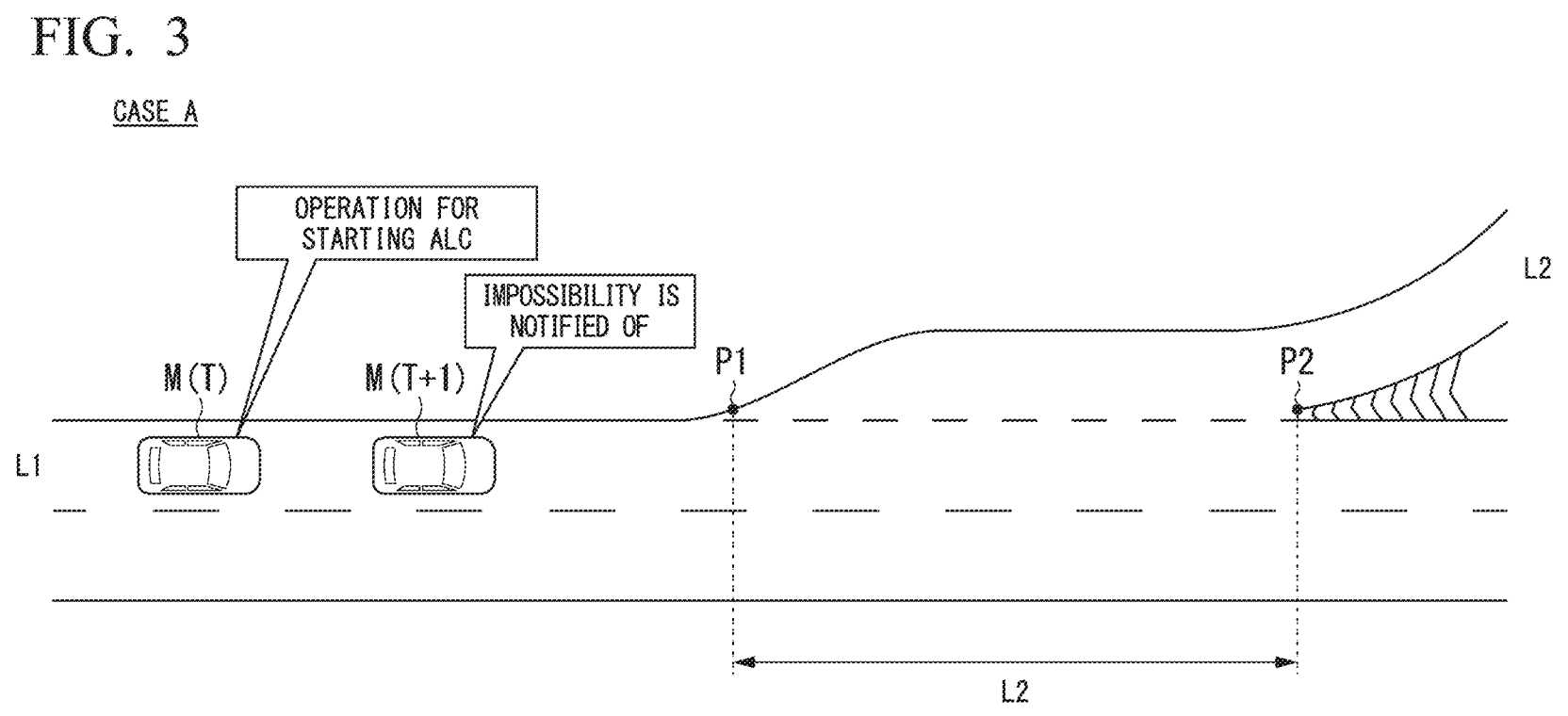

FIG. 3 is a diagram showing control in Case A. The difference from FIG. 2 will be mainly described. At time T, when the occupant of the vehicle M performs an operation of instructing automatic lane change control to the second lane L2 at a predetermined distance before the position P1, the determiner 152 determines whether the condition (a) is satisfied. When the condition (a) is not satisfied, the lane change controller 154 notifies the occupant that lane change to the second lane L2 is not possible by performing automatic lane change control. This notification is performed before the position P1. For example, this notification is performed at a predetermined distance before the position P1.

For example, a release position of the automatic lane change control is set on a near side in the traveling direction with respect to the end point (the position P2) of the connection area. When the vehicle M is traveling at a predetermined speed (a prescribed speed) equal to or higher than a prescribed speed and the release position is located on a near side in the traveling direction of the vehicle M with respect to the start point (the position P1) of the connection area, the lane change controller 154 cannot perform automatic lane change control and thus performs notification before the vehicle M arrives at the release position. The release position is a position at which lane change needs to be started to complete lane change to the position P2 when the vehicle M is traveling at the prescribed speed or a predetermined speed equal to or higher than the prescribed speed. The driving support device 100 identifies the release position and performs the notification before the vehicle M arrives at the release position.

For example, when the length L2 from the position P1 to the position P2 is small and the vehicle M changes the lane while traveling at the prescribed speed, lateral movement associated with the lane change may be suddenly performed. Accordingly, in case of the length L2, the vehicle M needs to perform lane change at a speed equal to or lower than the prescribed speed. However, since the automatic lane change control is performed at a speed equal to or higher than the prescribed speed, the lane change with the length L2 needs to be manually performed.

In Case A, the lane change controller 154 notifies the occupant that automatic lane change control is not possible on the near side with respect to the position P1, and thus the occupant can perform preparation for manual lane change with ample time. Accordingly, the automatic lane change control is performed, and thus it is possible to improve convenience to a user.

Case B

Figure 4:
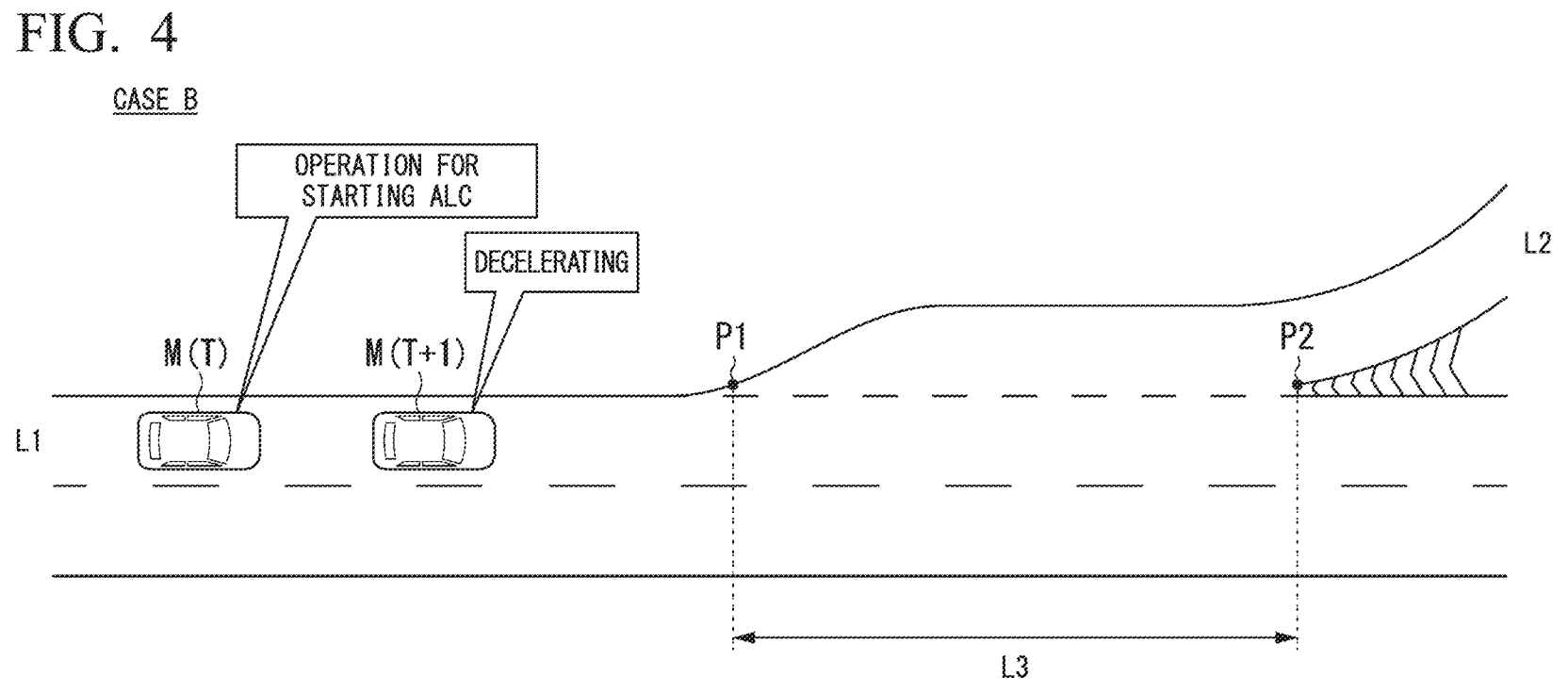

FIG. 4 is a diagram showing control in Case B. The difference from FIGS. 2 and 3 will be mainly described. In the example shown in FIG. 4, it is assumed that the condition (a) is satisfied and the speed of the vehicle M is controlled, for example, by the driving support device 100.

At time T, when the occupant of the vehicle M performs an operation of instructing automatic lane change control to the second lane L2 at a predetermined distance before the position P1, the determiner 152 determines whether the condition (b) is satisfied on the basis of a length L3 from the position P1 to the position P2 and the speed of the vehicle M. When the condition (b) is not satisfied, the lane change controller 154 decelerates the vehicle M. For example, the lane change controller 154 controls the speed of the vehicle M such that the speed of the vehicle M reaches an allowable speed or lower at the position P1.

For example, when the vehicle M changes the lane, a necessary length of the connection area changes according to the speed. At a current speed of the vehicle M or a speed when the vehicle M arrives at the connection area, the lane change may not be possible using the connection area with the length L3. In this case, when the automatic lane change control is stopped after the vehicle M has arrived at the connection area or it is notified that automatic lane change control is not possible, the driver needs to manually perform the lane change suddenly.

In Case B, the lane change controller 154 adjusts the speed of the vehicle M to a speed based on the length of the connection area such that automatic lane change control can be performed on the near side with respect to the position P1. Accordingly, the automatic lane change control is performed, and thus it is possible to improve convenience to a user.

Case C

The determiner 152 determines whether a road curvature at or in the vicinity of the second lane is a curvature in which automatic lane change control to the second lane is not possible when the vehicle M travels at a speed equal to or higher than the prescribed speed. The curvature is acquired with reference to the first map information 54 or the second map information 62 or acquired from the recognition result of the recognizer 110 similarly to the length of the connection area. When the determiner 152 determines that the road curvature is a curvature in which automatic lane change control to the second lane is not possible (for example, a curvature equal to or greater than a threshold value), the lane change controller 154 notifies the occupant of the vehicle M that the vehicle M is not able to change the lane to the second lane through the automatic lane change control before the vehicle M arrives at the second lane.

Figure 5:
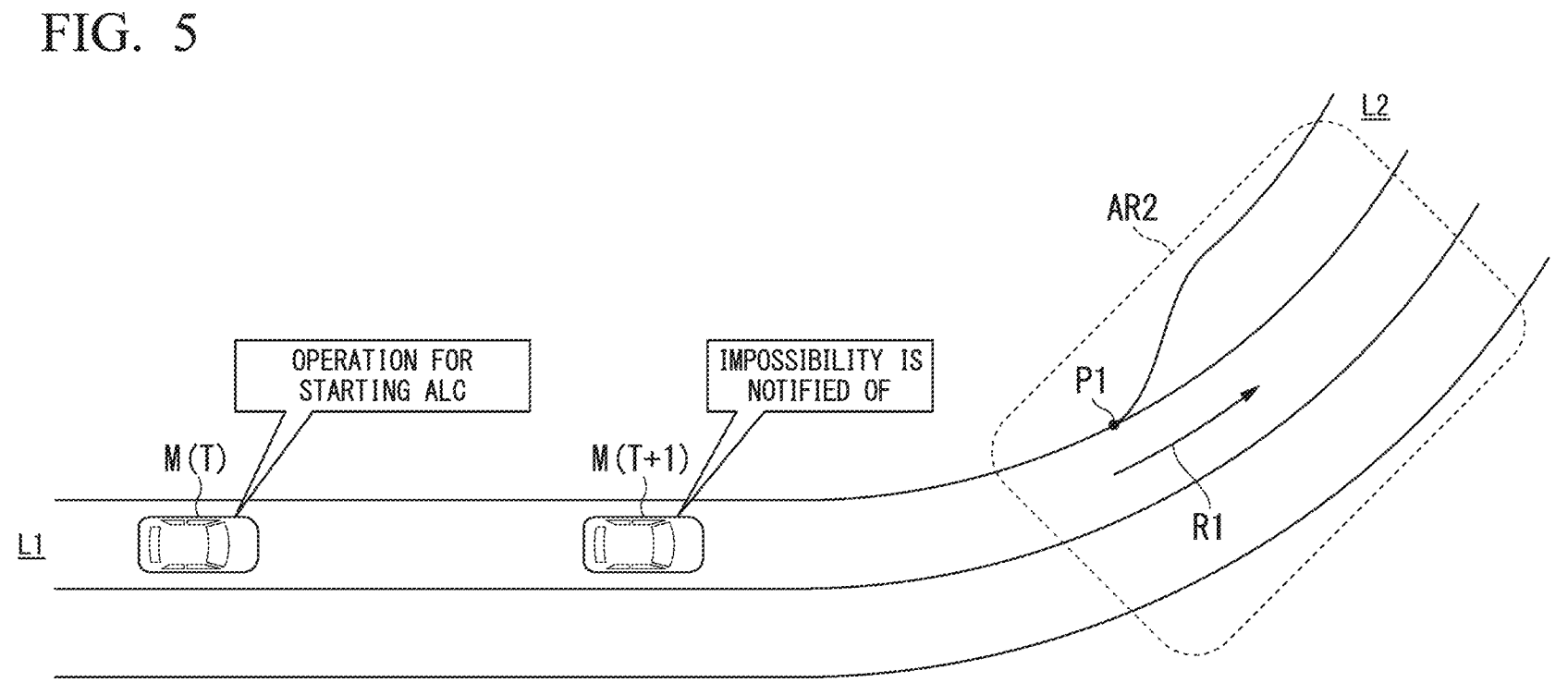

FIG. 5 is a diagram showing control in Case C. The difference from FIGS. 2 to 4 will be mainly described. At time T, when the occupant of the vehicle M performs an operation of instructing automatic lane change control to the second lane L2 at a predetermined distance before the position P1, the determiner 152 acquires a curvature of a target area. The target area is the second lane L2, the vicinity of the second lane L2, a start point of the connection area, or a road in the vicinity of the start point (for example, the first lane L1). The target area is, for example, an area included in an area AR2 in FIG. 5 or an area in the vicinity of the area AR2. An arrow R1 in FIG. 5 is an example of a curvature calculation target.

At time T+1, when the curvature is a curvature in which automatic lane change control to the second lane is not possible, the lane change controller 154 notifies the occupant of the vehicle M that the vehicle M is not able to change the lane to the second lane through automatic lane change control, for example, before the position P1.

For example, lane change via an area in which the curvature is equal to or greater than a threshold value may not be allowed through automatic lane change control. In this case, when the automatic lane change control is stopped or it is notified that automatic lane change control is not possible at a timing at which the vehicle M arrives at the position P1, the driver needs to manually perform lane change quickly.

In Case C, the lane change controller 154 notifies the driver that automatic lane change control is not possible on the near side with respect to the position P1, and thus the occupant can perform preparation for manual lane change with ample time. Accordingly, the automatic lane change control is performed, and thus it is possible to improve convenience to a user.

Summary

FIG. 6 is a diagram showing control in Cases A to C. When the length of the connection area is less than a length based on the speed at which automatic lane change control is possible as described above in Case A, the driving support device 100 notifies the driver that automatic lane change control is not possible at a predetermine distance before the start point of the connection area. When the length of the connection area is equal to or greater than a length based on the speed at which automatic lane change control is possible and the speed of the vehicle M is higher than the allowable speed as described above in Case B, the driving support device 100 decelerates the vehicle M to be equal to or lower than the allowable speed before the vehicle M arrives at the start point of the connection area. When a curvature of a lane or a road included in a target area is equal to or greater than the threshold value as described above in Case C, the driving support device 100 notifies the occupant that automatic lane change control is not possible at a predetermined distance before the start point of the connection area.

As described above, the driving support device 100 can realize control based on the shape of the connection area or the vicinity of the connection area. Accordingly, it is possible to improve convenience to a user.

The allowable speed will be described below. The determiner 152 acquires the allowable speed with reference to correspondence information 160. FIG. 7 is a diagram showing an example of the correspondence information 160. The correspondence information 160 is information stored in a storage of the driving support device 100. The correspondence information 160 is, for example, information in which a length range of a connection area is correlated with an allowable speed. For example, when the length is La, the allowable speed is X1 km/h. The determiner 152 acquires the allowable speed of a target connection area AR with reference to the correspondence information 160.

For example, when the curvature is less than the threshold value and the vehicle M travels on a road (the first lane L1 or the second lane L2) with a curvature in which automatic lane change control is possible, the determiner 152 acquires an allowable speed corresponding to the curvature. The allowable speed corresponding to the curvature is a speed obtained by applying a preset curvature index to an allowable speed corresponding to the length range. For example, when the curvature is equal to or less than the threshold value and the length of the connection area is La, a value obtained by multiplying the allowable speed X1 km/h by a coefficient corresponding to the curvature less than 1 is used as the allowable speed.

As described above, the driving support device 100 can realize control based on the shape by acquiring the allowable speed corresponding to a shape of a road or a connection area.

In the aforementioned example, when the determiner 152 determines that a curvature of a target area (for example, a start point of a connection area or a road in the vicinity of the start point) is a curvature in which automatic lane change control to the second lane L2 is not possible when the vehicle M travels at a speed equal to or higher than the prescribed speed and determines that the length of the connection area in the traveling direction is equal to or greater than the predetermined length after the vehicle M has passed through the start point, it may be determined that automatic lane change control is executable. For example, when it is determined that the length in the traveling direction of the connection area is the predetermined length on the basis of the recognition result of the recognizer 110, the determiner 152 may determine that automatic lane change control is executable. Accordingly, when a curvature at or in the vicinity of a start position of automatic lane change control is equal to or greater than the threshold value and the length of the connection area is a predetermined distance, the driving support device 100 performs automatic lane change control. As a result, it is possible to reduce a burden on an occupant of the vehicle.

The predetermined length is a length in which automatic lane change control is executable through deceleration in a range which is not less than the prescribed speed when a curvature of a target area (a start point of a connection area or a road in the vicinity of the start point) is less than the threshold value. For example, the predetermined length is set to be larger as the curvature becomes larger. By setting the predetermined length to be larger when a curvature at or in the vicinity of a start position of lane change is greater than a first curvature than when the curvature is equal to or less than the first curvature, the driving support device 100 can perform automatic lane change control with ample time even when the curvature is greater than the first curvature.

Flowchart

Figure 8:
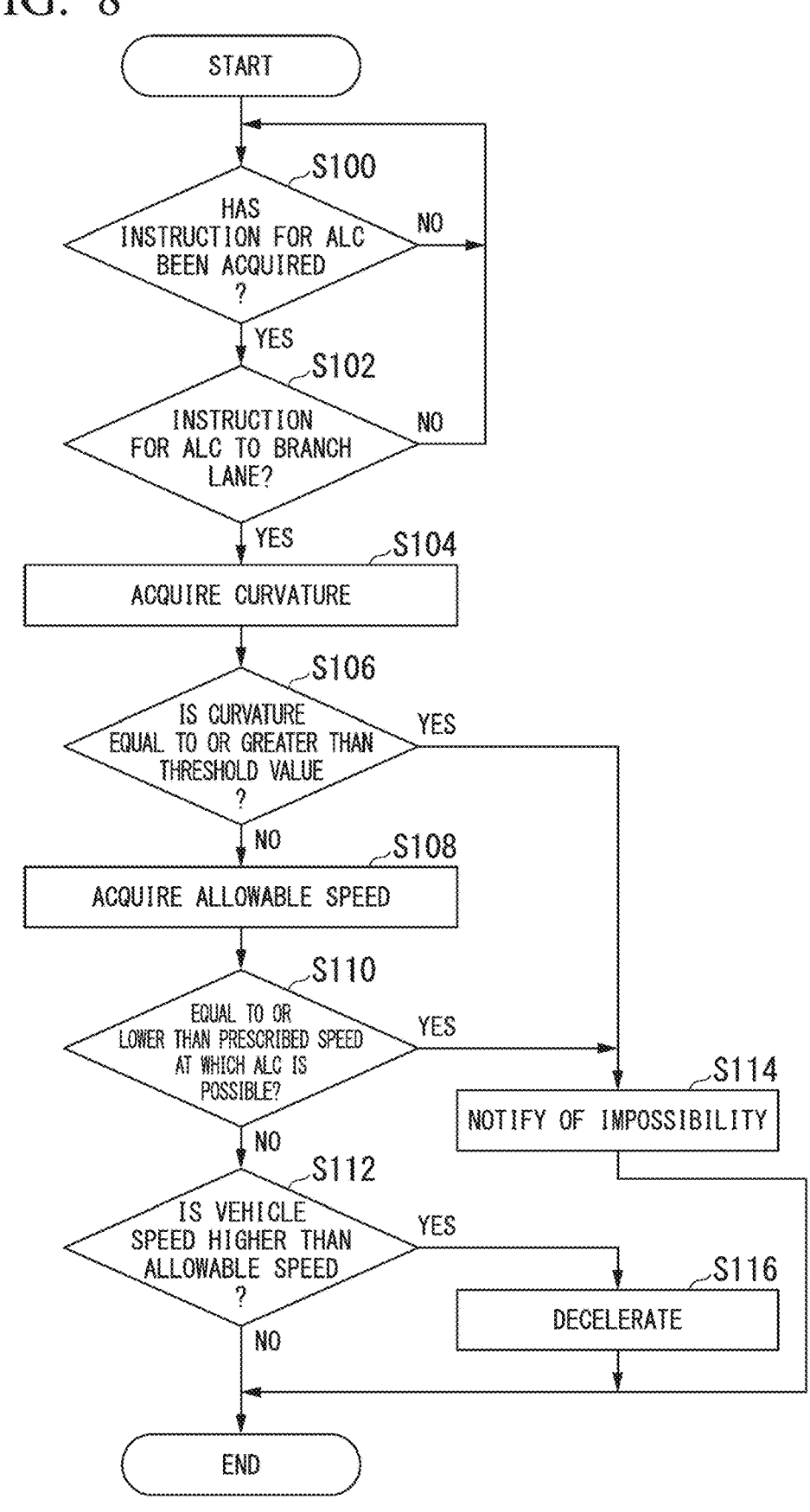
FIG. 8 is a flowchart showing an example of a process flow that is performed by a driving support device.

FIG. 8 is a flowchart showing an example of a process flow that is performed by the driving support device 100. First, the determiner 152 determines whether an instruction for performing automatic lane change control (an instruction for ALC) has been acquired (Step S100). When an instruction for performing automatic lane change control has been acquired, the determiner 152 determines whether the instruction is an instruction for lane change to a branch lane (Step S102). For example, when a driver operates the first operator 84, this operation is an operation for turning on the turn signal 90 to instruct lane change to a branch lane, and the operation is an operation for performing automatic lane change control, the determiner 152 determines that the instruction is an instruction for lane change to a branch lane.

Then, the determiner 152 acquires a curvature of a target area (Step S104) and determines whether the curvature is equal to or greater than a threshold value (Step S106). When the curvature is equal to or greater than the threshold value, the lane change controller 154 notifies the driver that automatic lane change control is not executable at a predetermine distance before a start point of a connection area (Step S114).

When the curvature is not equal to or less than the threshold value (when the curvature is less than the threshold value), the determiner 152 acquires an allowable speed corresponding to the connection area (Step S108). Then, the determiner 152 determines whether the allowable speed is equal to or less than the prescribed speed at which automatic lane change control is executable (Step S110). When the allowable speed is equal to or less than the prescribed speed at which automatic lane change control is executable, automatic lane change control is not executable, and thus the lane change controller 154 notifies the driver that automatic lane change control is not executable at a predetermined distance before the start point of the connection area (Step S114).

When the allowable speed is not equal to or less than the prescribed speed at which automatic lane change control is executable (when the allowable speed is greater than the prescribed speed at which automatic lane change control is executable), the lane change controller 154 determines whether a vehicle speed is higher than the allowable speed (Step S112). When the vehicle speed is higher than the allowable speed, the lane change controller 154 decelerates the vehicle M such that the speed is equal to or lower than the allowable speed (Step S116). Accordingly, the vehicle M can perform automatic lane change control in the connection area.

As described above, the driving support device 100 can perform notification in advance or control the speed of the vehicle M such that automatic lane change control is executable when automatic lane change control is not executable on the basis of the length of a connection area or the shape of a road, and thus it is possible to improve convenience to an occupant.

The above-mentioned embodiment can also be expressed as follows:

A control device including:

a storage device storing a program; and a hardware processor, wherein the hardware processor executes the program stored in the storage device to perform:

a process of determining whether automatic lane change control for automatically changing a lane of a mobile object to a second lane which is adjacent to a first lane in which the mobile object travels is executable;

a process of changing the lane of the mobile object when the automatic lane change control is executable;

the second lane being a lane which is not present at a position at which the mobile object is traveling and which is added in front of the position in a traveling direction of the mobile object, a process of determining (a) whether a length in the traveling direction of a connection area in which the first lane and the second lane are connected satisfies being a length for changing a lane of the mobile object to the second lane at a speed equal to or higher than a prescribed speed at which the automatic lane change control is executable;

a process of determining (b) whether changing a lane of the mobile object to the second lane is possible in the connection area at a current speed of the mobile object or a mobile object speed when the mobile object is assumed to arrive at the second lane;

a process of notifying an occupant of the mobile object that the mobile object is not able to change the lane to the second lane through the automatic lane change control before the mobile object arrives at the second lane when the mobile object is scheduled to change the lane to the second lane and when (a) is not satisfied; and a process of decelerating the mobile object to a speed at which the mobile object is able to change the lane to the second lane and which is equal to or higher than the prescribed speed when the mobile object is scheduled to change the lane to the second lane and when (a) is satisfied and (b) is not satisfied.

While exemplary embodiments of the present invention have been described above, the present invention is not limited to the embodiments and can have various modifications and substitutions applied thereto without departing from the gist of the present invention.

What is claimed is:

1. A control device comprising:

a storage medium storing computer-readable instructions; and one or more processors connected to the storage medium, wherein the one or more processors execute the computer-readable instructions to perform:

determining whether automatic lane change control for automatically changing a lane of a mobile object to a second lane which is adjacent to a first lane in which the mobile object travels is executable;

changing the lane of the mobile object when the automatic lane change control is executable;

the second lane being a lane which is not present at a position at which the mobile object is traveling and which is added in front of the position in a traveling direction of the mobile object, determining (a) whether a length in the traveling direction of a connection area in which the first lane and the second lane are connected satisfies being a length for changing a lane of the mobile object to the second lane at a speed equal to or higher than a prescribed speed at which the automatic lane change control is executable;

determining (b) whether changing a lane of the mobile object to the second lane is possible in the connection area at a current speed of the mobile object or a mobile object speed when the mobile object is assumed to arrive at the second lane;

notifying an occupant of the mobile object that the mobile object is not able to change the lane to the second lane through the automatic lane change control before the mobile object arrives at the second lane when the mobile object is scheduled to change the lane to the second lane and when (a) is not satisfied; and decelerating the mobile object to a speed at which the mobile object is able to change the lane to the second lane and which is equal to or higher than the prescribed speed when the mobile object is scheduled to change the lane to the second lane and when (a) is satisfied and (b) is not satisfied.

2. The control device according to claim 1, wherein the one or more processors execute the computer-readable instructions to perform determining that (b) is not satisfied when the length in the traveling direction of the connection area is less than a length in which the mobile object is able to change the lane to the second lane at the mobile object speed.

3. The control device according to claim 2, wherein a release position of the automatic lane change control is set on a near side in the traveling direction with respect to an end point of the connection area, and wherein the one or more processors execute the computer-readable instructions to perform delivery of the notification before the mobile object arrives at the release position because the automatic lane change control is not executable when the mobile object travels at a speed equal to or higher than the prescribed speed and the release position is located on a near side in the traveling direction with respect to a start point of the connection area.

4. The control device according to claim 1, wherein the one or more processors execute the computer-readable instructions to perform determining that (b) is satisfied when the mobile object speed is equal to or lower than an allowable speed, and wherein the allowable speed is a speed which is set according to the length of the connection area in the traveling direction and at which the mobile object is able to change the lane to the second lane from the first lane.

5. The control device according to claim 1, wherein the one or more processors execute the computer-readable instructions to perform:

determining whether a road curvature in the second lane or in the vicinity of the second lane is a curvature in which the automatic lane change control to the second lane is not executable when the mobile object travels at a speed equal to or higher than the prescribed speed; and notifying the occupant of the mobile object that the mobile object is not able to change the lane to the second lane through the automatic lane change control before the mobile object arrives at the second lane before the mobile object arrives at the second lane when it is determined that the road curvature is a curvature in which the automatic lane change control to the second lane is not executable.

6. The control device according to claim 5, wherein the one or more processors execute the computer-readable instructions to perform:

determining whether a road curvature at a start point of the connection area or in the vicinity of the start point of the connection area is a curvature in which the automatic lane change control to the second lane is not executable when the mobile object travels at a speed equal to or higher than the prescribed speed; and notifying the occupant of the mobile object that the mobile object is not able to change the lane to the second lane through the automatic lane change control before the mobile object arrives at the second lane before the mobile object arrives at the second lane when it is determined that the road curvature is a curvature in which the automatic lane change control to the second lane is not executable.

7. The control device according to claim 6, wherein the one or more processors execute the computer-readable instructions to perform determining that the automatic lane change control to the second lane is executable when it is determined that the road curvature at the start point or in the vicinity of the start point of the connection area is a curvature in which the automatic lane change control to the second lane is not executable when the mobile object travels at a speed equal to or higher than the prescribed speed and it is determined that the length in the traveling direction is equal to or greater than a predetermined length.

8. The control device according to claim 7, wherein the predetermined length is a length in which the automatic lane change control is executable when the road curvature at the start point or in the vicinity of the start point of the connection area is equal to or less than a threshold value and the mobile object is decelerated in a range which is not less than the prescribed speed.

9. The control device according to claim 1, wherein the one or more processors execute the computer-readable instructions to perform:

determining that (a) is satisfied when an allowable speed correlated with the length in the traveling direction of the connection area is equal to or greater than a prescribed speed at which the automatic lane change control is executable; and determining that (b) is satisfied when the mobile object speed is equal to or lower than an allowable speed, and wherein the allowable speed is a speed which is set according to the length in the traveling direction of the connection area and at which the mobile object is able to change the lane.

10. A control method that is performed by a computer, the control method comprising:

a process of determining whether automatic lane change control for automatically changing a lane of a mobile object to a second lane which is adjacent to a first lane in which the mobile object travels is executable;

a process of changing the lane of the mobile object when the automatic lane change control is executable;

the second lane being a lane which is not present at a position at which the mobile object is traveling and which is added in front of the position in a traveling direction of the mobile object, a process of determining (a) whether a length in the traveling direction of a connection area in which the first lane and the second lane are connected satisfies being a length for changing a lane of the mobile object to the second lane at a speed equal to or higher than a prescribed speed at which the automatic lane change control is executable;

a process of determining (b) whether changing a lane of the mobile object to the second lane is possible in the connection area at a current speed of the mobile object or a mobile object speed when the mobile object is assumed to arrive at the second lane;

a process of notifying an occupant of the mobile object that the mobile object is not able to change the lane to the second lane through the automatic lane change control before the mobile object arrives at the second lane when the mobile object is scheduled to change the lane to the second lane and when (a) is not satisfied; and a process of decelerating the mobile object to a speed at which the mobile object is able to change the lane to the second lane and which is equal to or higher than the prescribed speed when the mobile object is scheduled to change the lane to the second lane and when (a) is satisfied and (b) is not satisfied.

11. A storage medium storing a program, the program causing a computer to perform:

a process of determining whether automatic lane change control for automatically changing a lane of a mobile object to a second lane which is adjacent to a first lane in which the mobile object travels is executable;

a process of changing the lane of the mobile object when the automatic lane change control is executable;

the second lane being a lane which is not present at a position at which the mobile object is traveling and which is added in front of the position in a traveling direction of the mobile object, a process of determining (a) whether a length in the traveling direction of a connection area in which the first lane and the second lane are connected satisfies being a length for changing a lane of the mobile object to the second lane at a speed equal to or higher than a prescribed speed at which the automatic lane change control is executable;

a process of determining (b) whether changing a lane of the mobile object to the second lane is possible in the connection area at a current speed of the mobile object or a mobile object speed when the mobile object is assumed to arrive at the second lane;

a process of notifying an occupant of the mobile object that the mobile object is not able to change the lane to the second lane through the automatic lane change control before the mobile object arrives at the second lane when the mobile object is scheduled to change the lane to the second lane and when (a) is not satisfied; and a process of decelerating the mobile object to a speed at which the mobile object is able to change the lane to the second lane and which is equal to or higher than the prescribed speed when the mobile object is scheduled to change the lane to the second lane and when (a) is satisfied and (b) is not satisfied.

* * * * *